Figure 1:
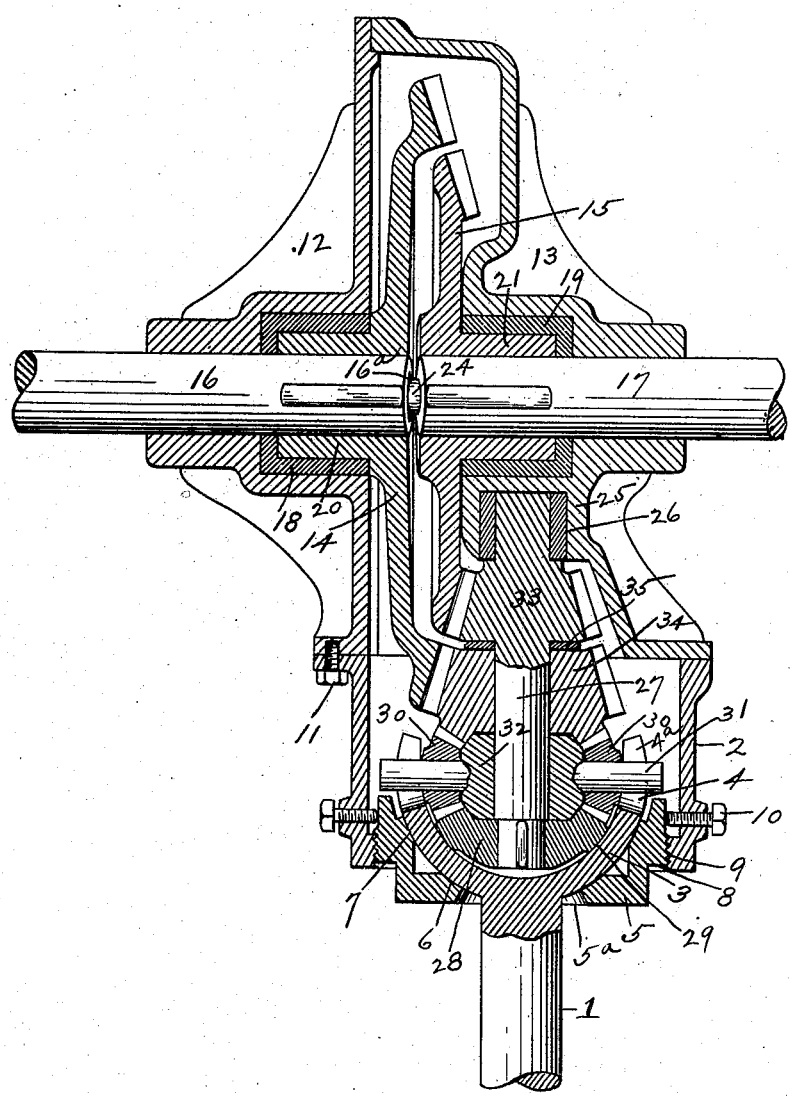

B. W. BROCKETT.
DIFFERENTIAL MECHANISM.
APPLICATION FILED NOV. 29, 1905.

915,827.

Patented Mar. 23, 1909.
2 SHEETS—SHEET 1.

Witnesses:
A. L. Lord.
C. McElroy.

Inventor,
Bluford W. Brockett,
By Fouts & Hull.
Attorneys.

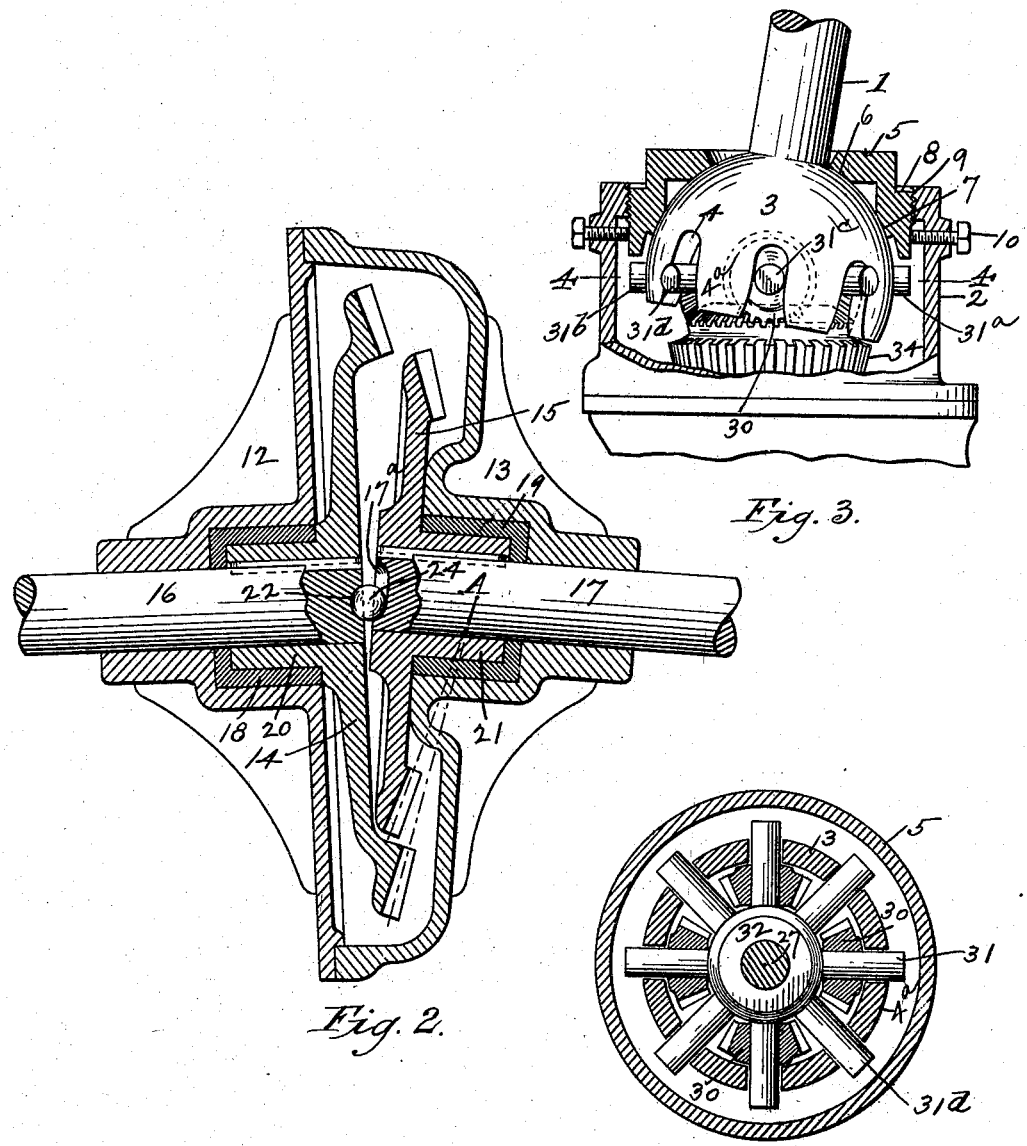

UNITED STATES PATENT OFFICE.

BLUFORD W. BROCKETT, OF CLEVELAND, OHIO, ASSIGNOR, BY MESNE ASSIGNMENTS, TO ROSS GEAR AND TOOL COMPANY, OF LA FAYETTE, INDIANA, A CORPORATION OF INDIANA.

DIFFERENTIAL MECHANISM.

No. 915,827.   Specification of Letters Patent.   Patented March 23, 1909.

Application filed November 29, 1905. Serial No. 289,609.

*To all whom it may concern:*

Be it known that I, BLUFORD W. BROCKETT, residing at Cleveland, in the county of Cuyahoga and State of Ohio, have invented a certain new and useful Improvement in Differential Mechanism, of which the following is a full, clear, and exact description, reference being had to the accompanying drawings.

My invention relates to differential or compensating mechanism, and particularly to mechanism of the type shown and described in the application of D. E. Ross, No. 257,255, filed April 24, 1905.

The object of said invention is to adapt said mechanism to inclined shaft sections and to dispense with the employment with said mechanism and inclined shaft sections of several of the universal joints employed for this purpose. The inclination of the rear axle sections is of importance in automobile construction, as it prevents sagging of such sections and provides for dished wheels which, from their sightliness, are in great demand with the trade. By the mechanism herein shown and described, I attain these objects in an exceedingly simple, inexpensive, and effective manner.

Referring to the drawings:—Figure 1 represents a longitudinal sectional view showing an embodiment of my invention; Fig. 2 represents a longitudinal sectional view of the shaft or axle sections, driven gears and gear cases, said view being taken at right angles to the plane of Fig. 1 and showing the inclination of the axle sections; Fig. 3 represents a side elevation of the cup or cage by which the compensating gears are driven from the drive shaft, the casing and parts of the cup being broken away; and Fig. 4 represents a transverse sectional view through said cup or cage and its inclosing casing.

The power or drive shaft 1 extends into the casing 2. The rear end of said shaft is enlarged to form a rounded cup or cage 3, said cup or cage being substantially hemi-spherical on the inner and outer surfaces thereof and being provided with a number of slots 4 extending inwardly from the enlarged end thereof. The outer surface of said cup is engaged by a cap 5, which may be threaded into the ends of the casing 2 and is provided with a suitable number of concave annular surfaces 6 and 7 for engaging the outer surface of said cup to form a bearing therefor. The ring 5, as previously stated, is threaded into the casing 2. This is accomplished by means of a flange 8 having at its rear or outer end the screw thread 9. The inner portion of said flange is plain, for engagement by the set screws 10, extending through the casing 2 and engaging such plain portion to prevent rotation of the ring by the cup.

The casing section 2 is removably fitted, as by bolts 11, to the casing sections 12 and 13 which contain the driven gears 14 and 16 for the shaft or axle sections 16 and 17 respectively. These driven gears are nested one within the other, the gear 15 being sufficiently smaller than the gear 14 to permit such nesting. Bearings 18 and 19 are provided in the casings 12 and 13 respectively for the hubs 20 and 21 of the gears 14 and 15 respectively. As will appear more particularly from Fig. 2, the sections 16 and 17 are inclined, preferably at an angle of about 2½ degrees from the horizontal. In order to drive the gears 14 and 15 with best efficiency, it is necessary that the pitch lines thereof should meet at a common point. Owing to the arrangement of the gears, this point, indicated at A, Fig. 2, is on the section 17. This necessarily brings the inner end of the section 17 above the corresponding end of the section 16. To space the gears and reduce the friction to a minimum, there is provided a raceway 16ª, which may be in the end of the section 16 (see Fig. 1) or a raceway 17ª which may be in the end of the section 17 (see Fig. 2) with a corresponding socket 22 in the end of the other section for the ball 24.

The inclination of the shaft or axle sections causes the lower peripheries of the gears 14 and 15 to approach each other, as shown in Fig. 3, but the gears are so proportioned as to permit the lower periphery of the smaller gear 15 to rotate within the larger gear 14 without engagement therewith.

The casing section 13 is provided with a boss or enlargement 25. This boss or enlargement is provided with a bearing 26, in axial alinement with the opening 5ª in the cap 5, for the reception of the rear or inner end of the intermediate shaft 27. This shaft extends nearly to the drive shaft 1 and has keyed to its outer end a beveled gear 28. This gear has its outer surface rounded to fit within the cup 3 and is provided with an annular bearing surface 29 engaging the inner surface of said cup to transfer the thrust on the shaft 27 to the said cup. Within the rear portion of the cup are the compensating pinions 30. These pinions are carried on pins 31 projecting from a sleeve 32 which is loose on the shaft 27. These pins project through slots 4 in the cup 3, whereby said pinions are driven planetarily from said cup and the drive shaft 1.

Rigid with the shaft 27 is the beveled gear 33, said gear meshing with and driving the gear 15. Sleeved on said shaft 27 and in front of the gear 33 is the two-faced beveled gear 34, said gear having teeth on one of its faces meshing with the gear 14 and teeth on its other face meshing with the pinions 30. A spacing ring 35 may be interposed between gears 33 and 34. The gear 33 bears the same ratio to the gear 15 as does the gear 34 to the gear 14.

In order to prevent the use of skew gears, the shaft 27 should be at right angles to a plane through the axles of the inclined sections 16 and 17, in this instance a substantially vertical plane. As the shaft of an automobile is inclined with respect to the direction of shaft 27, it becomes necessary to employ a universal joint to connect said shafts. The cup 3 on the end of the drive shaft provides such universal joint. The slots in said cup are so shaped as to form between them the double cycloidal teeth 4ª. That is to say, the cycloidal curve by which the outer portion of each tooth engages the pin is continued inwardly to the bottom of the slot or recess. The advantage of this will be apparent from an inspection of Fig. 3, wherein it will be seen that, owing to the inclination of the drive shaft to the axis of the intermediate shaft, one of the pins 31ª will be near the bottom of a slot or the inner end of a tooth at the time when the opposite pin 31ᵇ is near the outer end of its slot or tooth, the pins intermediate of pins 31ª and 31ᵇ occupying intermediate positions, while the pin 31ᶜ, which is shown as 90 degrees from pin 31ª and 31ᵇ, will occupy the middle of the slot. By this construction, the cup 3 constitutes a universal joint, by means of which the compensating pinions are driven with a minimum amount of friction. As shown, in order to secure sufficient driving points, a series of pins 31ᵈ may be provided between the pins which carry the beveled pinions, said pins 31ᵈ projecting from the sleeve 32.

By making the opposite edges of the teeth 4ª symmetrical it will be seen that said teeth are adapted to drive the mechanism in either direction, it being understood that means, not shown, may be provided for reversing the rotation of the drive shaft 1.

By the construction herein shown and described, it will be apparent that I am enabled to dispense with universal joints between the driven gears 14 and 15 and their respective shaft or axle sections. Moreover, the cup 3 and cap 5 permit me to dispense with the employment of a universal joint outside of the gear casing.

Having thus described my invention what I claim as new and desire to secure by Letters-Patent is:—

1. The combination of a pair of inclined shaft sections, a gear on each of said shaft sections adjacent the inner ends, said gears being of different sizes, the smaller gear nesting within the larger gear, driving gears for said first-mentioned gears, and means for differentially operating said driving gears, said means including a universal joint substantially as specified.

2. The combination of a pair of inclined shaft sections, a gear on each said shaft sections adjacent the inner ends thereof, said gears being of different diameters and the larger gear being cupped or concaved to permit the smaller gear to nest therein, driving gears for said first-mentioned gears, a power or drive shaft, and means for operating said driving gears differentially from the power or drive shaft, said means including a universal joint substantially as specified.

3. The combination of a pair of inclined shaft sections, each of said shaft sections having a recess in the inner end thereof, a ball in said recesses, a gear on each of said sections, a driving gear for each of the first-mentioned gears, a power or drive shaft, and means for operating said driving gears differentially therefrom, substantially as specified.

4. The combination of a pair of inclined shaft sections, the ends of said sections being opposed, the inner end of one of said sections being above the inner end of the other, one of said sections having a socket in the end thereof and the other a raceway in the end thereof, a ball in said socket and raceway, and means for driving said sections differentially substantially as specified.

5. In a differential mechanism, the combination of a pair of driven gears, driving gears therefor, a power shaft, said shaft having the end adjacent said driving gears provided with a hemi-spherical cup, compensating gears for said driving gears, means for driving said compensating gears from said cup, and a bearing for the external surface of said cup, substantially as specified.

6. In a differential mechanism, the combination of a pair of driven gears, driving gears therefor, a power or drive shaft having its end provided with a cup the outer surface of which is convex, compensating gears for said driving gears, means for operating said compensating gears by said cup, and a bearing for the outer surface of said cup, substantially as specified.

7. In a differential mechanism, the combination of a casing, driven gears therein, driving gears for said driven gears, a power or drive shaft having a cup at the end thereof, said cup being convex on its outer surface and projecting within said casing, a bearing in said casing for said cup, and compensating mechanism driven by said cup and operating the driving gears, substantially as specified.

8. In a differential mechanism, the combination of a pair of driven gears, a pair of driving gears therefor, compensating mechanism for said driving gears, a casing inclosing said mechanism, a power or drive shaft having a cup on the end thereof, said cup being provided with a spherical outer surface, a bearing within said casing for such outer surface of the cup, and means for operating the compensating mechanism from said cup, substantially as specified.

9. In a differential mechanism, the combination of driven gears, driving gears for said driven gears, compensating mechanism for said driving gears, a power or drive shaft having its end provided with a cup having an outer spherical surface, said cup being provided with slots extending inwardly from the open end thereof to provide teeth, means for driving said compensating mechanism by said teeth, and a bearing for the outer surface of the cup, substantially as specified.

10. In a differential mechanism, the combination of driven gears, driving gears therefor, compensating pinions for said driving gears, a power or drive shaft provided with a cup having an outer spherical surface and provided with teeth adapted to operate the compensating mechanism, and a bearing for the outer surface of such cup, substantially as specified.

11. In a differential mechanism, the combination of driven gears, driving gears therefor, a power or drive shaft having its outer end provided with a cup having an outer spherical surface and provided with slots extending inwardly from the end thereof to form teeth, a shaft intermediate said cup and said driven gears, driving gears on said shaft, compensating pinions carried by said intermediate shaft, pins projecting from said pinions into the slots in the cup, and a bearing for the outer surface of said cup, substantially as specified.

12. In a differential mechanism, the combination of driven gears, a power or drive shaft provided at its end with a cup having a spherical outer surface, there being slots extending inwardly from the outer end of the cup to provide teeth, a shaft intermediate said cup and driven gears, driving gears on said shaft, a sleeve on said shaft having pins projecting therefrom into the slots in the cup, and compensating pinions carried by said sleeve, substantially as specified.

13. In a differential mechanism, the combination of a pair of driven gears, a power or drive shaft provided at its end with a cup having an outer spherical surface and slots projecting inwardly from the end of said cup to form teeth, a shaft intermediate of said cup and said driven gears, driving gears for said driven gears, a sleeve on said shaft, pins projecting from said sleeve and engaging said slot, compensating pinions mounted on some of said pins, and a bearing for the outer surface of said cup, substantially as specified.

14. In a differential mechanism, the combination of driven gears, a shaft, driving gears on said shaft for said driven gears and compensating pinions for said driving gears, a power or drive shaft extending at an angle to the first-mentioned shaft and having at its end a cup provided with a convex outer surface, said cup driving said compensating pinions, and a bearing having a surface adapted to engage the convex outer surface of said cup, substantially as specified.

15. In a differential mechanism, the combination of driven members, a shaft, driving members on said shaft for said driven members, a sleeve, pins projecting from said sleeve, compensating pinions on said pins, a power or drive shaft provided at its end with a cup having a convex outer surface and slots extending inwardly from the open end thereof to form teeth for operating said pinions, and a bearing having a concave surface for engaging the convex outer surface of said cup, substantially as specified.

16. In a differential mechanism, the combination of driven gears, a shaft, driving gears on said shaft for said driven gears, a sleeve, pins projecting from said sleeve, compensating pinions on said pins, a power or drive shaft having its end provided with a cup having an outer spherical surface and slots extending inwardly from the outer end of said cup, and a bearing having a surface for engaging the convex outer surface of the cup, substantially as specified.

17. In a differential mechanism, the combination of driven gears, driving gears for said driven gears, compensating pinions for said driving gears, a casing inclosing said pinions, said casing having a cap adjustably fitted thereto, a power or drive shaft extending through said cap into the casing and having a cup on the end thereof provided with means for operating said pinions, the outer surface of said cup being convex, and the inner surface of said cap having a concave surface forming a bearing for the outer surface of said cup, substantially as specified.

18. In a differential mechanism, the combination of a pair of inclined shaft sections, a driven member on each of said sections, a power shaft, a shaft intermediate said power shaft and said driven members, driving gears on said shaft, a cup carried by said power shaft having slots therein, compensating gears for operating said driving gears, a pin for each of said compensating gears adapted to enter a slot in said cup, a casing inclosing said compensating gears, and a cap for said casing having one or more bearing surfaces for the exterior of said cup, substantially as specified.

In testimony whereof I affix my signature in the presence of two witnesses.

BLUFORD W. BROCKETT.

Witnesses:
S. E. FOUTS,
WM. ROSS.